(12) United States Patent
Wang et al.

(10) Patent No.: US 7,366,248 B2
(45) Date of Patent: Apr. 29, 2008

(54) OPTIMIZED HIGH RATE SPACE-TIME CODES FOR WIRELESS COMMUNICATION

(75) Inventors: Jibing Wang, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 690 days.

(21) Appl. No.: 10/898,917

(22) Filed: Jul. 26, 2004

(65) Prior Publication Data

US 2006/0018403 A1 Jan. 26, 2006

(51) Int. Cl.
*H04B 7/02* (2006.01)
(52) U.S. Cl. ...................... 375/267; 455/101
(58) Field of Classification Search ............... 375/267, 375/347, 349, 299; 455/8, 101, 103, 132, 455/133
See application file for complete search history.

(56) References Cited

U.S. PATENT DOCUMENTS

| | | | |
|---|---|---|---|
| 6,185,258 B1 | 2/2001 | Alamouti et al. | |
| 6,430,231 B1 | 8/2002 | Calderbank et al. | |
| 6,741,658 B1* | 5/2004 | Ionescu | 375/267 |
| 7,248,638 B1* | 7/2007 | Banister | 455/101 |
| 2002/0044611 A1 | 4/2002 | Hassibi et al. | |
| 2003/0236076 A1* | 12/2003 | Brunel | 455/101 |
| 2007/0004366 A1* | 1/2007 | Prasad et al. | 455/272 |

OTHER PUBLICATIONS

Biglieri, E. et al., "Recent Results on Coding for the Multiple-Antenna Transmission Systems", Proc. IEEE ISSSTA'2000, Sep. 2000.
Telatar, E., "Capacity of Multi-Antenna Gaussian Channels", European Trans. Telecomm., vol. 10, No. 6, Nov.-Dec. 1999.
Foschini, G.J. et al., "On Limits of Wireless Communications in a Fading Environment When Using Mulitple Antennas", Wireless Pers. Commun., vol. 6, Mar. 1998.
Hassibi, B. et al., "High-Rate Codes That are Linear in Space and Time", IEEE Trans. Inform. Theory, vol. 48, Jul. 2002.
Damen, M.O. et al., "Lattice Code Decoder for Space-Time Codes", IEEE Commun. Letters, vol. 4, May 2000.
Foschini, G.J., "Layered Space-Time Architecture for Wireless Communication in a Fading Environment When Using Multielement Antennas", Bell Labs Tech. Jour., vol. 1, Aut. 1996.
Foshini, G.J. et al., "Simplified Processing for High Spectal Efficiency Wireless Communication Employing Multi-Element Arrays", IEEE J. Select Areas Commun, vol. 17, Nov. 1999.
Heath, R.W. et al., "Linear Dispersion Codes for MIMO Systems Based on Frame Theory", IEEE Trans. on Sig. Proc., vol. 50, Oct. 2002.

(Continued)

*Primary Examiner*—Khai Tran
(74) *Attorney, Agent, or Firm*—Joseph J. Kolodka (57) ABSTRACT

A space-time coding arrangement for wireless communications is disclosed where the codes are generated through stochastic approximation. The codes can be optimized over a wide range of performance metrics, receiver structures, and channel characteristics.

28 Claims, 3 Drawing Sheets

OTHER PUBLICATIONS

Varadarajan, B. et al., "Optimization of Full Rate Diversity Linear Space-Time Codes Using the Union Bound", IEEE Information Theory Workshop, Mar. 2003.

Fu, M.C., "Optimization via Simulation: A Review", Annals of Operations Research, vol. 53, Nov. 1992.

Andradottier, S., "A Review of Simulation Optimization Techniques", Proceedings of the 1998 Winter Simulation Conference.

Guey, J.-C et al., "Signal Design for Transmitter Diversity Wireless Communication Systems Over Rayleigh Fading Channels", Proc. IEEE VTC' 1996.

Guey, J.-C et al., Signal Design for Transmitter Diversity Wireless Communication Systems Over Rayleigh Fading Channels, IEEE Trans. Commun., vol. 47, Apr. 1999.

Tarokh, V. et al., "Space-Time Codes for High Data Rate Wireless Communication: Performance Criterion and Code Construction", IEEE Trans. Inform. Theory, vol. 44, Mar. 1998.

Alamouti, S.M., "A Simple Transmit Diversity Technique for Wireless Communications", IEEE J. Selec. Areas Commun., vol. 16, Oct. 1998.

Tarokh, V. et al., "Space-Time Block Codes From Orthogonal Designs", IEEE Trans. Inform. Theory, vol. 45, Jul. 1999.

Zheng, L. et al., "Diversity and Multiplexing: A Fundamental Tradeoff in Multiple Antenna Channels", IEEE Trans. Inform. Theory, May 2003.

Parsons, J.D. et al., "Characterization of Mobile Radio Signals: Model Description", IEEE Proc.-I, vol. 138, Dec. 1991.

Chen, T.-A et al., "A Space-Time Model for Frequency Nonselective Fading Channels with Applications", Proc. IEEE Globecom 1997.

Chen, T.-A et al., "A Space-Time Model for Frequency Nonselective Rayleigh Fading Channels with Applications to Space-Time Modems", IEEE J. Sel. Areas Comm., vol. 18, Jul. 2000.

Chuah, C. et al., "Capacity Scaling in MIMO Wireless Systems Under Correlated Fading", IEEE Trans. Inform. Theory, vol. 48, Mar. 2002.

Shiu, D. et al., "Fading Correlation and Its Effect on the Capacity of Multielement Antenna Systems", IEEE Trans. Commun, vol. 48, Mar. 2000.

Fitz, M.P. et al., "A New View of Performance Analysis Techniques in Correlated Rayleigh Fading", Proc. IEEE WCNC 1999.

Bolcskei, H. et al., "Performance of Space-Time Codes in the Presence of Spatial Fading Correlations", Proc. Asilomar Conference, Sep. 2000.

Bolcskei, H. et al., "Impact of the Propagation Environment on the Performance of Space-Frequency Coded MIMO-OFDM", IEEE J. Sel. Areas Comm., vol. 21, Apr. 2003.

Byun, M.-K. et al., "New Bounds of Pairwise Error Probability for Space-Time Codes in Rayleigh Fading Channels", Proc. IEEE WCNC 2002.

Lu, H.F. et al., "Remarks on Space-Time Codes Including a New Lower Bound and an Improved Code", IEEE Trans. Inform. Theory, vol. 49, Oct. 2003.

Gamal, H.E. e tal., "Universal Space-Time Coding", IEEE Trans. Inform. Theory, vol. 48, May 2003.

Ma, X. et al., "Full-Diversity Full Rate Complex Field Space-Time Coding", IEEE Trans. on Sig. Proc., vol. 41, Nov. 2003.

Zhou, S. et al., "Optimal Transmitter Eigen-Beamforming and Space-Time Block Coding Based on Channel Correlations", IEEE Trans. Inform. Theory, vol. 49, Jul. 2003.

Damen, M.O. et al., "Diagonal Algebraic Space-Time Block Codes", IEEE Trans. Inform. Theory, vol. 48, Mar. 2002.

Damen, M.O. et al., "Linear Threaded Algebraic Space-Time Constellations", IEEE Trans. Inform. Theory, vol. 49, Oct. 2003.

* cited by examiner

OPTIMIZED HIGH RATE SPACE-TIME CODES FOR WIRELESS COMMUNICATION

BACKGROUND OF INVENTION

The invention relates to wireless communication networks, and, more particularly, to techniques for effective wireless communication in the presence of fading and other degradations.

The physical limitations of a wireless channel pose significant challenges for reliable communication. A variety of techniques have been devised to address such issues, including antenna diversity which is seen as a practical and effective technique for reducing the effect of multipath fading in most scattering environments. The classical approach to antenna diversity is to use multiple antennas at the receiver and perform combining or some form of selection to improve the quality of the received signal. Recently, transmitter diversity techniques have been explored, primarily motivated by the feasibility of having multiple antennas at the base station. Spatial multiplexing provided by transmitter diversity facilitates multiple data pipes within the same frequency band, thereby yielding a linear increase in capacity. It has also been discovered that an effective approach to increasing the data rate as well as the power efficiency over wireless channels is to introduce temporal and spatial correlation into signals transmitted from different antennas. This has led to the design of what are referred to in the art as "space-time codes" in which information is transmitted as codewords from multiple antennas at multiple time intervals typically in the form of complex valued amplitudes modulated onto a carrier wave. See, e.g., J.-C. Guey, M. P. Fitz, M. R. Bell, and W.-Y. Kuo, "Signal Design for Transmitter Diversity Wireless Communication Systems over Rayleigh Fading Channels," *Proc. IEEE VTC'96*, pp. 136-140, 1996; V. Tarokh, N. Seshadri, A. R. Calderbank, "Space-Time Codes for High Data Rate Wireless Communication: Performance Criterion and Code Construction," *IEEE Trans. Inform. Theory*, vol. 44, pp. 744-765, March 1998.

Linear dispersion (LD) codes, for example, are a form of space-time codes that use a linear modulation framework where the transmitted codeword is a linear combination over space and time of certain dispersion matrices with the transmitted symbols. See B. Hassibi and B. Hochwald, "High-Rate Codes that are Linear in Space and Time", *IEEE Trans. Inform. Theory*, vol. 48, pp. 1804-1824, July 2002. Linear dispersion codes have the advantages of a very simple encoder design and, furthermore, can be decoded very efficiently either by a polynomial time maximum likelihood decoder, i.e., sphere decoder, or by a suboptimal decoder, e.g., a nulling and cancellation receiver. The linear dispersion codes disclosed by Hassibi et al. were designed to optimize average mutual information; unfortunately, maximizing the average mutual information does not necessarily lead to better performance in terms of error rate. More recently, another scheme based on the linear dispersion code framework called threaded algebraic space-time (TAST) coding has been proposed. See H. E. Gamal, and M. O. Damen, "Universal Space-Time Coding," *IEEE Trans. Inform. Theory*, vol. 48, pp. 1097-1119, May 2003. TAST codes are designed based on the threaded layering concept and algebraic number theory, and the design focuses on the worst-case pairwise error probability (PEP). The pairwise error probability, however, may not be the main target for performance evaluation also. The actual dependence of error probability on SNR passes not only through the PEPs but also through the "error coefficients" of the code, i.e., the multiplicity of code word pairs that lead to the same PEP. In general it is not true that the codes optimized with respect to the worst case pairwise error probability will end up with optimum bit or frame error performance.

Accordingly, there is a need for a new approach to the construction of space-time codes that can be optimized to a selected performance metric while still remaining flexible enough to handle different decoder structures.

SUMMARY OF INVENTION

A design methodology is disclosed herein which is capable of constructing space-time codes for encoding signals from any number of transmitter antennas, where the codes advantageously can be optimized for an arbitrary performance metric, such as bit or frame error probability, and for a selected decoder structure. In accordance with an embodiment of the invention, stochastic approximation is utilized to construct a set of space-time codes for a system with a pre-specified number of transmit and receive antennas. A series of simulated observations are generated using a model of the known communication channel characteristics. The simulated observations are decoded using a selected receiver structure, and measurements are computed of the selected performance characteristic to be optimized for the system. An estimate of the gradient of the performance characteristic as a function of the coding parameters utilized is obtained, and the gradient estimate is then used to update the coding parameters. The updates to the coding parameters can be iterated until convergence to an optimal set of space-time codes. The space-time codes can then be used to encode transmissions from a transmitter with the pre-specified number of transmit antennas to a receiver utilizing the pre-specified number of receive antennas and the selected receiver structure.

The present invention advantageously can be utilized in systems where performance analysis based on algebraic number theory is intractable. Unlike the prior art, the disclosed approach can generate space-time codes which can be applied to a wide range of receiver structures. Moreover, the codes can be optimized in a manner that takes into account issues such as long term spatially correlated fading.

These and other advantages of the invention will be apparent to those of ordinary skill in the art by reference to the following detailed description and the accompanying drawings.

DETAILED DESCRIPTION

Figure 1:
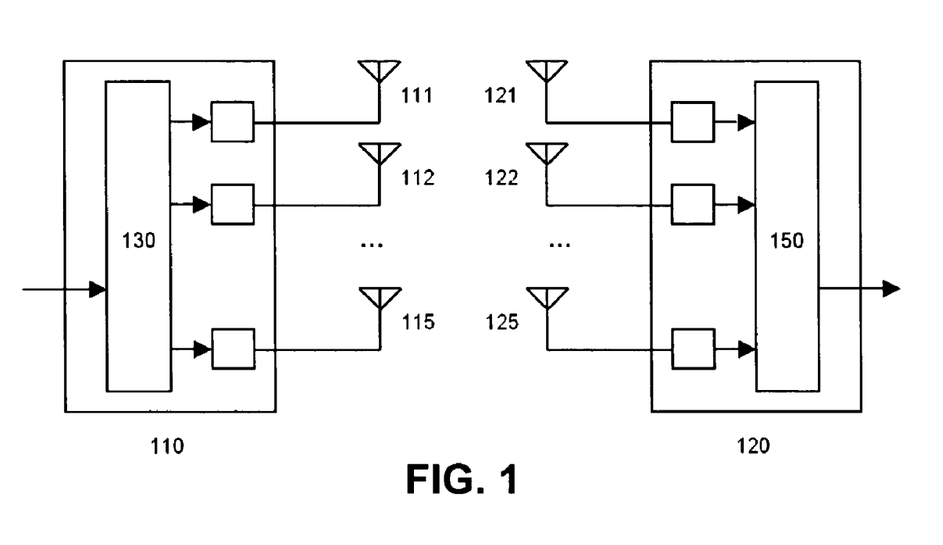
FIG. 1 is an abstract diagram of a transmitter and receiver, suitable for practice of an embodiment of the invention.

FIG. 1 shows a block diagram of a transmitter 110 and a receiver 120, suitable for practice of an embodiment of the invention. The transmitter 110 has $M_T$ transmit antennas 111, 112, . . . 115 and the receiver has $M_R$ receive antennas 121, 122, . . . 125. It is assumed, for purposes of the channel model used herein, that the channel is frequency nonselective and remains constant for T symbol intervals. The fading coefficient from the i-th transmit antenna to the j-th receive antenna is denoted by $h_{i,j}$.

The transmitter 110 utilizes a coder 130 which arranges the transmitted symbols such that the signal transmitted from the i-th transmit antenna at time index t is denoted by $x_{t,i}$. The receiver 120 has a corresponding decoder 150 where the signal received at the j-th receive antenna at time t is denoted by $y_{t,j}$. The input output relation is given by $$y_{t,j} = \sqrt{\rho} \sum_{i=1}^{M_T} h_{i,j} x_{t,i} + w_{t,j}, t = 1, \cdots, T, j = 1, \cdots, M_R \quad (1)$$

where the noise $w_{t,j}$ can be modeled as independent samples of a zero-mean complex Gaussian random variable with unit variance. The transmitted energy on all the $M_T$ antennas 111, 112, . . . 115 at any given time can be normalized to unity, so that ρ would be the expected SNR at each receive antenna 121, 122, . . . 125 regardless of the number of transmit antennas. This equation can be written in matrix form as $$Y = \sqrt{\rho} X H + W, \quad (2)$$

where Y is the $T \times M_R$ matrix of the received signal, X is the $T \times M_T$ matrix of the transmitted signal, W is the $T \times M_R$ matrix of the additive white Gaussian noise, and H is the $M_T \times M_R$ channel matrix. When restricted to a Rayleigh fading scenario, the $M_T \times M_R$ elements of H are composed of independent identically distributed (i.i.d.) circularly symmetric complex Gaussian random variables with zero mean and unit variance.

Note that the following notation is utilized herein: scalars are denoted in lower case, vectors are column vectors unless otherwise indicated and are denoted in lower case bold, while matrices are in upper case bold. Tr (R) denotes the trace of the matrix R. $R^T$ and $R^H$ denote transpose and the conjugate transpose of R, respectively. $I_M$ is the M×M identity matrix.

The goal is to construct codes for the coder 130 and decoder 150 that optimize some performance characteristic of the system. For example, it can be advantageous to optimize a performance metric such as the average bit error probability (BEP) or the frame error performance. Consider, for example and without limitation, a set of linear dispersion codes. See B. Hassibi and B. Hochwald, "High-Rate Codes that are Linear in Space and Time", *IEEE Trans. Inform. Theory*, vol. 48, pp. 1804-1824, July 2002. The linear dispersion codes introduced therein are designed to maximize the average mutual information. Unfortunately, maximizing the average mutual information does not necessarily lead to better performance in terms of error rate. Accordingly, it is advantageous to optimize the linear dispersion codes in terms of error rate rather than mutual information. Unfortunately, the average bit or frame error rate are hard to analyze for arbitrary linear dispersion codes.

Linear dispersion codes use a linear modulation framework, and the transmitted codeword is a linear combination of certain dispersion matrices with the transmitted symbols. Assume one transmits Q r-QAM symbols $\{s_q\}_{q=1}^Q$ over T symbol intervals, the linear dispersion codes X are given by $$X = \sum_{q=1}^{Q} \alpha_q A_q + j \beta_q B_q, \quad (3)$$

where the transmitted symbols $s_q$ have been decomposed into their real and imaginary parts $$s_q = \alpha_q + j \beta_q, q = 1, \ldots, Q,$$

and $\{A_q, B_q\}_{q=1}^Q$ are the dispersion matrices that specify the codes. The rate of the codes is R=(Q/T) $\log_2 r$. It is also assumed that the dispersion matrices $\{A_q, B_q\}_{q=1}^Q$ satisfy the following energy constraint $$\sum_{q=1}^{Q} Tr(A_q^H A_q + B_q^H B_q) = 2TM_T. \quad (4)$$

Denote $Y_R = \Im\{Y\}$ and $Y_I = \Im\{Y\}$. Denote the columns $Y_R$, $Y_I$, $H_R$, $H_I$, $W_R$ and $W_I$ by $y_{R,n}$, $y_{I,n}$, $h_{R,n}$, $h_{I,n}$, $w_{R,n}$ and $w_{I,n}$; and define $$\mathcal{A}_q = \begin{bmatrix} A_{R,q} & -A_{I,q} \\ A_{I,q} & A_{R,q} \end{bmatrix}, \quad (5)$$

$$\mathcal{B}_q = \begin{bmatrix} -B_{I,q} & -B_{R,q} \\ B_{R,q} & -B_{I,q} \end{bmatrix}, q = 1, \ldots, Q, \quad (6)$$

$$\underline{h}_i = \begin{bmatrix} h_{R,i} \\ h_{I,i} \end{bmatrix}, i = 1, \ldots, M_R. \quad (7)$$

Then, the equations can be gathered in $Y_R$ and $Y_I$ to form the single real system of equations $$\underbrace{\begin{bmatrix} y_{R,1} \\ y_{I,1} \\ \vdots \\ y_{R,n_R} \\ y_{I,n_R} \end{bmatrix}}_{y} = \sqrt{\rho} \, \mathcal{H} \underbrace{\begin{bmatrix} \alpha_1 \\ \beta_1 \\ \vdots \\ \alpha_Q \\ \beta_Q \end{bmatrix}}_{x} + \underbrace{\begin{bmatrix} w_{R,1} \\ w_{I,1} \\ \vdots \\ w_{R,n_R} \\ w_{I,n_R} \end{bmatrix}}_{w} \quad (8)$$

where the equivalent $2M_R T \times 2Q$ real channel matrix is given by $$\mathcal{H} = \begin{bmatrix} \mathcal{A}_1 \underline{h}_1 & \mathcal{B}_1 \underline{h}_1 & \cdots & \mathcal{A}_Q \underline{h}_1 & \mathcal{B}_Q \underline{h}_1 \\ \vdots & \vdots & \ddots & \vdots & \vdots \\ \mathcal{A}_1 \underline{h}_{M_R} & \mathcal{B}_1 \underline{h}_{M_R} & \cdots & \mathcal{A}_Q \underline{h}_{M_R} & \mathcal{B}_Q \underline{h}_{M_R} \end{bmatrix}. \quad (9)$$

As mentioned above, the average bit or frame error rate are hard to analyze for arbitrary linear dispersion codes. For example, the empirical bit error probability (BEP) is denoted herein as γ (y, x, h, θ) for a given set of dispersion matrices, a given channel realization, a given information symbol vector x, and a given received signal vector y. The set of dispersion matrices is denoted as $$\theta \triangleq \{A_q, B_q, q=1, \ldots, Q\}, \quad (10)$$

and the channel realization as h, i.e., $$h = [\underline{h}_1^T \ldots \underline{h}_{M_R}^T]^T. \quad (11)$$

When θ is given, the average BEP is obtained by $$\Upsilon(\theta) = E(\gamma(y, x, h, \theta)) \quad (12)$$

$$= \int \int \int \gamma(y, x, h, \theta) p(y, x, h|\theta) \, dy \, dx \, dh,$$

where p (y, x, h |θ) is the joint probability density function (pdf) of (y, x, h) for a given θ. Note that the empirical BEP γ (y, x, h, θ) usually cannot be given in closed form. Also, γ (y, x, h, θ) depends on the receiver structure. Optimizing the design of the linear dispersion codes requires a solution to the following optimization problem $$\min_{\theta \in \Theta} \Upsilon(\theta), \quad (13)$$

where the constraint set Θ is given by $$\Theta = \left\{ \theta : \sum_{q=1}^{Q} Tr(A_q^H A_q + B_q^H B_q) \leq 2TM_T \right\}. \quad (14)$$

Note that one does not lose any optimality in the constraint set by relaxing the energy constraint as the minimum cost always occurs when the energy constraint is satisfied with equality. From the above, $$\Upsilon(\theta) = E_x E_h E_{y|x, h, \theta}(\gamma(y, x, h, \theta)), \quad (15)$$

where $$E_{y|x, h, \theta}(\gamma(y, x, h, \theta)) = \int \gamma(y, x, h, \theta) p(y|x, h, \theta) dy, \quad (16)$$

with p (y|x, h, θ) the conditional pdf of y given (x, h, θ). Note that because p (y|x, h, θ) can be shown to be Gaussian, and it is continuously differentiable in θ, it follows that Y (θ) is continuously differentiable in θ. Hence Y (θ) attains a minimum on the compact set Θ.

Although there is no closed-form formula for γ (y, x, h, θ)—it can be evaluated by using the technique of simulation optimization. See, e.g., M. C. Fu, "Optimization via Simulation: A Review," Annals of Operations Research, Vol. 53, pp.199-248, 1994; S. Andradottir, "A Review of Simulation Optimization Techniques," Proceedings of the 1998 Winter Simulation Conference, 151-158, 1998.

Figure 2:
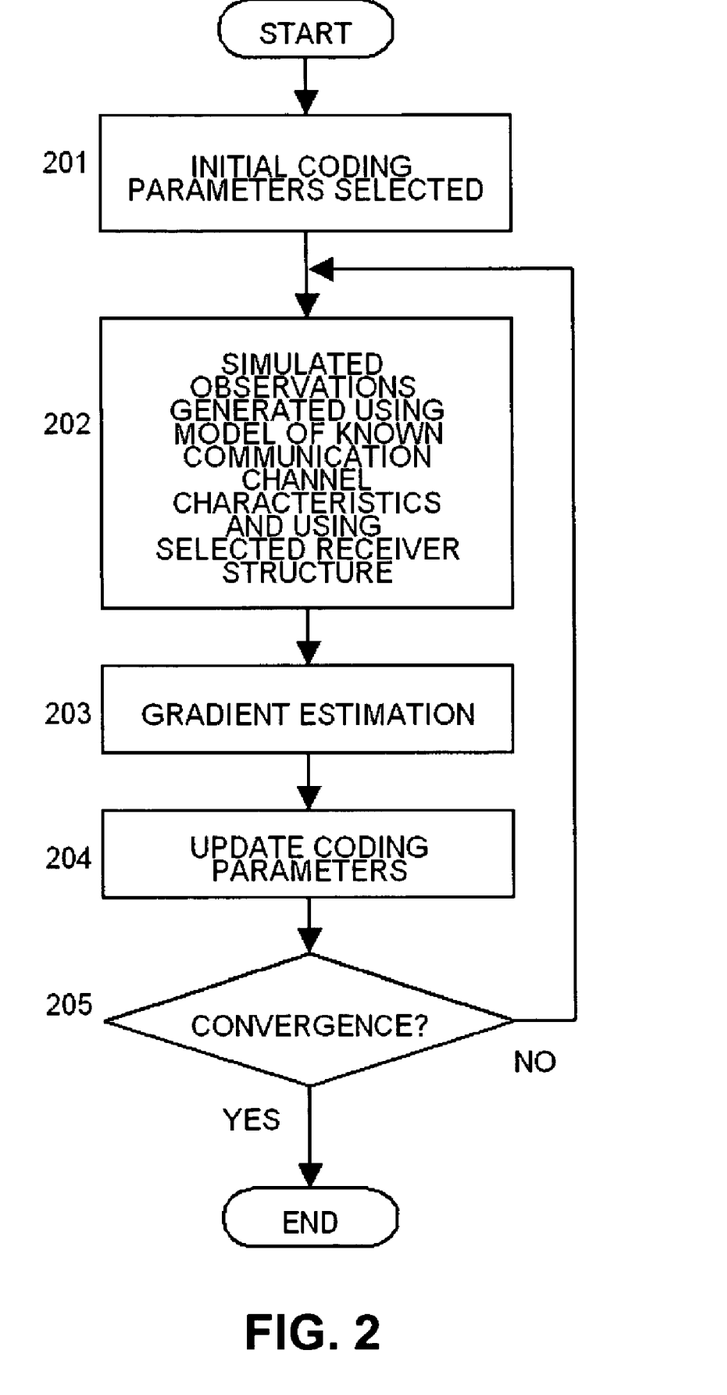
FIG. 2 is a flowchart of processing performed in constructing a set of space-time codes, in accordance with an embodiment of the invention.

FIG. 2 shows the overall methodology for constructing space-time codes for a particular transmitter/receiver combination, in accordance with an embodiment of the invention. Stochastic approximation is utilized in FIG. 2 to optimize some selected performance metric. It is assumed that the space-time code is parameterized in some advantageous manner. For example, the linear dispersion codes described above can be parameterized in terms of the dispersion matrices utilized in the code.

At step 201, a set of initial coding parameters are selected for the space-time code. The initial coding parameters can be selected randomly or, more preferably, optimized in some manner. At step 202, a series of simulated observations are generated using a model of the known communication channel characteristics. The simulated observations are decoded using a selected receiver structure. The receiver structure advantageously can be other than the conventional maximum likelihood receiver and can even be one of the many suboptimal detector designs. Measurements of the selected performance metric to be optimized for the system can then be computed. At step 203, an estimate of the gradient of the performance metric as a function of the coding parameters utilized is obtained. The basic assumption of stochastic approximation is that the solution to the optimization problem can be solved by finding the zeros of the gradient. At step 204, the coding parameters may be updated using the gradient estimate. These steps 202 to 204 can then be iterated until the coding parameters, at step 205, converge to some advantageous solution. In accordance with the Robbins-Munro algorithm, the coding parameters should converge to a locally optimal solution as long as the bias of the gradient estimates go to zero.

Figure 3:
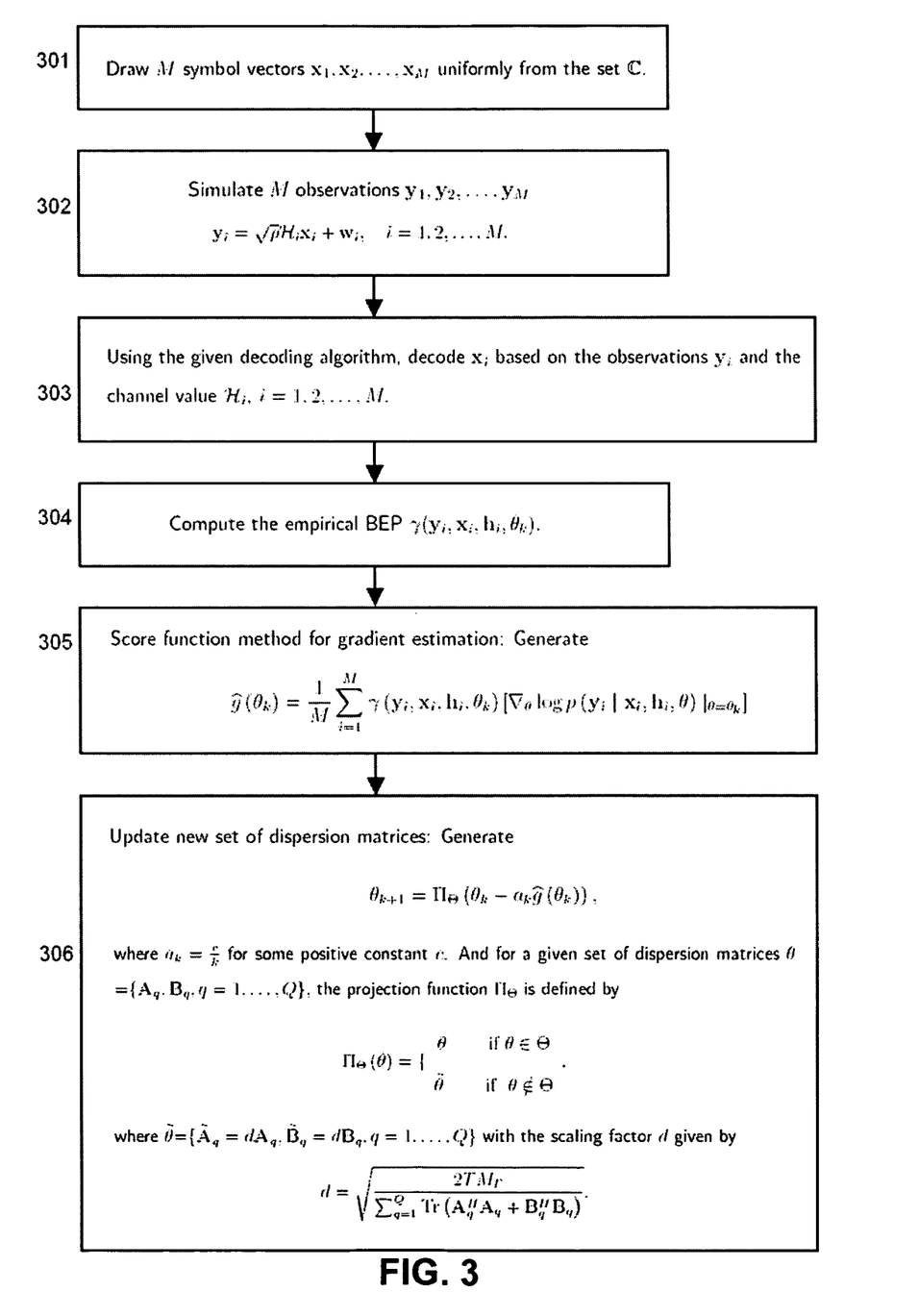
FIG. 3 is a more detailed flowchart for construction of an arbitrary set of linear dispersion codes, in accordance with an embodiment of the invention.

FIG. 3 shows a more detailed description of an embodiment of the present invention applied to optimizing the average bit error probability (BEP) for arbitrary linear dispersion codes. It is assumed that at the k-th iteration the current set of dispersion matrices is $\theta_k$. The steps shown in FIG. 3 are performed during the next iteration to generate $\theta_{k+1}$. As mentioned above, an initial feasible point can be randomly chosen. Alternatively, one can obtain better codes by, for example, varying the initial condition and picking the best solution. Other methods can be applied to search the global optimum solution such as simulated annealing. See, e.g., H. Fang, F. Gong, and M. Qian, "Annealing of Iterative Stochastic Schemes," SIAM J. Control Optim. Vol. 35, pp. 1886-1907, 1997.

In FIG. 3 at steps 301-304, a mixture sample is generated. At step 301, M symbol vectors $x_1, x_2, \ldots, x_M$ are drawn uniformly from the set C, where C is the set composed of all the possible transmitted symbol vectors x. At step 302, M observations $y_1, y_2, \ldots, y_M$ are simulated where each $y_i$ is generated according to Equation (8) above using symbol vector $x_i$, i.e., $$y_i = \sqrt{\rho} H_i x_i + w_i, \quad i = 1, 2, \ldots, M. \quad (17)$$

At step 303, the selected decoding structure is modeled to decode $x_i$ based on the observations $y_i$ and the channel value $H_i$, i=1, 2, ..., M. At step 304, the empirical BEP γ ($y_i$, $x_i$, $h_i$, $\theta_k$) can then be computed.

At step 305, it is necessary to generate an estimate of the gradient $\nabla_\theta \Upsilon(\theta)$ with respect to the current set of dispersion matrices, $\theta_k$. As discussed below, although the gradient cannot be computed analytically, it is possible to generate an estimator using the score function or likelihood ratio method. The following estimator is generated:

$$\hat{g}(\theta_k) = \frac{1}{M} \sum_{i=1}^{M} \gamma(y_i, x_i, h_i, \theta_k) [\nabla_\theta \log p(y_i | x_i, h_i, \theta)|_{\theta=\theta_k}] \quad (18)$$

where an explicit formula for $\nabla_\theta \log p (y|x, h, \theta)$ is given below. It can be shown that the gradient estimator is unbiased, i.e., $$E(\hat{g}(\theta_k)) = \nabla_\theta \Upsilon(\theta)|_{\theta=\theta_k}, \text{ for and } k=1, 2, \ldots \quad (19)$$

Although the estimator is unbiased for any integer M, the variance will be smaller for larger M.

At step 306 in FIG. 3, the new set of dispersion matrices may be updated. The dispersion matrices are generated using the following equation:

$$\theta_{k+1} = \Pi_\Theta(\theta_k - a_k \hat{g}(\theta_k)), \quad (20)$$

where $a_k = c/k$ for some positive constant c. And for a given set of dispersion matrices $\theta = \{A_q, B_q, q=1, \ldots, Q\}$, the projection function $\Pi_\Theta$ is defined by $$\Pi_\Theta(\theta) = \begin{cases} \theta & \text{if } \theta \in \Theta \\ \tilde{\theta} & \text{if } \theta \notin \Theta \end{cases}, \quad (21)$$

where $\tilde{\theta}=\{\tilde{A}_q=dA_q, \tilde{B}_q=dB_q, q=1, \ldots, Q\}$ with the scaling factor d given by $$d = \sqrt{\frac{2TM_T}{\sum_{q=1}^{Q} Tr(A_q^H A_q + B_q^H B_q)}}. \quad (22)$$

As long as the bias of the gradient estimate $\hat{g}(\theta_n)$ goes to zero, the sequence of estimates of the optimal solution should converge.

It can be shown that if $\theta \notin \Theta$, the function $\Pi_\Theta$ set forth above projects $\theta$ to the nearest point in $\Theta$. In essence, when $\theta \notin \Theta$, the function $\Pi_\Theta$ simply scales $\theta$ such that the energy constraint is satisfied with equality. Let $\Phi=\{\phi \in R^d: \|\phi\| \leq 1\}$, for and $\overline{\omega} \in R^d$ with $\|\overline{\omega}\|>1$, define $$\psi = \arg\min_{\phi \in \Phi} \|\overline{\omega} - \phi\|. \quad (23)$$

Then, it can be proven that $$\psi = \frac{\overline{\omega}}{\|\overline{\omega}\|}. \quad (24)$$

Clearly $\psi \in \Phi$, and for any $\phi \in \Phi$, we have $$\|\overline{\omega}-\phi\| \geq \|\overline{\omega}\| - \|\phi\| \geq \|\overline{\omega}\| - 1 = \|\overline{\omega}-\psi\|. \quad (25)$$

From the above, the set of optimum dispersion matrices $\theta=\{A_q, B_q, q=1, \ldots, Q\}$ depend on the number of transmit antennas $M_T$, the number of receive antennas $M_R$, and the QAM constellations used. The searching result $\theta$ also depends on the operating SNR as both the empirical BEP $\gamma$ $(y, x, h, \theta)$ and $\nabla_\theta \log p$ $(y|x, h, \theta)$ depend on SNR (see below). Therefore, the codes generated by the design procedure set forth in FIG. 3 will also depend on SNR. Due to the continuity of the BEP with respect to SNR, however, it is expected that the codes optimized for a particular SNR will work acceptably for a whole range of SNR of interest.

Although $\nabla_\theta Y(\theta)$ cannot be computed analytically, it is possible to estimate the gradient $\nabla_\theta Y(\theta)$. For a given set of dispersion matrices $\theta$, a given information symbol vector x, a given channel realization h, from Equation (8) it can be shown that y is Gaussian with mean $\sqrt{\rho}Hx$ and covariance matrix $1/2 I_{2TM_R}$, namely, $$p(y|x, h, \eta)=\rho^{-TM_R} \exp(-(y-\sqrt{\rho}Hx)^T(y-\sqrt{\rho}Hx)). \quad (26)$$

From Equations (15) and (16), $$\nabla_\theta Y(\theta) = E_x E_h[\nabla_\theta E_{y|x,h,\theta}(\gamma(y, x, h, \theta))] \quad (27)$$

$$= E_x E_h \int \nabla_\theta [\gamma(y, x, h, \theta) p(y|x, h, \theta)] dy$$

$$= E_x E_h \int [(\nabla_{\theta y}(y, x, h, \theta)) p(y|x, h, \theta) +$$

$$\gamma(y, x, h, \theta)(\nabla_\theta p(y|x, h, \theta))] dy,$$

where it is assumed some regularity conditions hold such that the derivative and integral can be interchanged.

It can be shown for maximum likelihood detection, with probability one, as well as for suboptimal decoders such as nulling and cancellation receivers, that $$\nabla_\theta \gamma(y, x, h, \theta)=0. \quad (28)$$

The proof for this proposition is provided in an APPENDIX. From this proposition, it can be shown that $$\nabla_\theta Y(\theta) = E_x E_h \int \gamma(y, x, h, \theta) \nabla_\theta p(y|x, h, \theta) dy \quad (29)$$

$$= E_x E_h \int \gamma(y, x, h, \theta) \frac{\nabla_\theta p(y|x, h, \theta)}{p(y|x, h, \theta)} p(y|x, h, \theta) dy$$

$$= E_x E_h E_{y|x,h,\theta}[\gamma(y, x, h, \theta) \nabla_\theta \log p(y|x, h, \theta)].$$

The gradient estimator in the above form is referred to as the score function.

The gradients $\nabla_\theta \log p$ $(y|x, h, \theta)$ required by the score function above can be computed as follows. Note that it is necessary simply to compute the gradient of the following function $$f \triangleq -(y-\sqrt{\rho}Hx)^T(y-\sqrt{\rho}Hx). \quad (30)$$

The gradient of f is first computed with respect to $A_{R,q}$. The (n,l)th entry of the gradient of f $(A_{R,q})$ is $$\left[\frac{\partial f(A_{R,q})}{\partial A_{R,q}}\right]_{n,l} = \lim_{\delta \to 0} \frac{f(A_{R,q} + \delta \varsigma_n \eta_l^T) - f(A_{R,q})}{\delta}, \quad (31)$$

where $\varsigma_n$ and $\eta_l$ are T-dimensional and $M_T$-dimensional unit column vectors with one in the nth and lth entries, respectively, and zeros elsewhere. From Equation (9), $$H_{A_{R,q}+\delta_{\varsigma_n \eta_l^T}}=H+\delta \Xi_{n,l}^{A_{R,q}}, \quad (32)$$

$$\Xi_{n,l}^{A_{R,q}} = \begin{bmatrix} 0 & 0 & \ldots & \Lambda_{n,l}^{A_{R,q}} h_1 & 0 & \ldots & 0 & 0 \\ \vdots & \vdots & \ddots & \vdots & & \vdots & \ddots & \vdots & \vdots \\ 0 & 0 & \ldots & \Lambda_{n,l}^{A_{R,q}} h_{M_R} & 0 & \ldots & 0 & 0 \end{bmatrix}, \quad (33)$$

with $$\Lambda_{n,l}^{A_{R,q}} = \begin{bmatrix} \varsigma_n \eta_l^T & 0 \\ 0 & \varsigma_n \eta_l^T \end{bmatrix}. \quad (34)$$

Then $$f(A_{R,q} + \delta \varsigma_n \eta_l^T) = \left(y - \sqrt{\rho} \mathcal{H}_{A_{R,q}+\delta \varsigma_n \eta_l^T} x\right)^T \left(y - \sqrt{\rho} \mathcal{H}_{A_{R,q}+\delta \varsigma_n \eta_l^T} x\right) \quad (35)$$

$$= -\left(y - \sqrt{\rho} \mathcal{H}x - \sqrt{\rho} \delta \Xi_{n,l}^{A_{R,q}} x\right)^T \left(y - \sqrt{\rho} \mathcal{H}x - \sqrt{\rho} \delta \Xi_{n,l}^{A_{R,q}} x\right)$$

$$= f + \sqrt{\rho} \delta x^T \left(\Xi_{n,l}^{A_{R,q}}\right)^T \left(y - \sqrt{\rho} \mathcal{H}x\right) +$$

$$\sqrt{\rho} \delta \left(y - \sqrt{\rho} \mathcal{H}x\right)^T \Xi_{n,l}^{A_{R,q}} x + o(\delta).$$

Therefore, $$\left[\frac{\partial f(A_{R,q})}{\partial A_{R,q}}\right]_{n,l} = \quad (36)$$

$$\sqrt{\rho} x^T \left(\Xi_{n,l}^{A_{R,q}}\right)^T \left(y - \sqrt{\rho} \mathcal{H}x\right) + \sqrt{\rho} \left(y - \sqrt{\rho} \mathcal{H}x\right)^T \Xi_{n,l}^{A_{R,q}} x.$$

For the gradients with respect to $A_{I,q}$, $B_{R,q}$, and $B_{I,q}$, similar expressions can be given as $$\left[\frac{\partial f(A_{I,q})}{\partial A_{I,q}}\right]_{n,l} = \tag{37}$$
$$\sqrt{\rho}\, x^T \left(\Xi_{n,l}^{A_{I,q}}\right)^T (y - \sqrt{\rho}\,\mathcal{H}x) + \sqrt{\rho}\,(y - \sqrt{\rho}\,\mathcal{H}x)^T \Xi_{n,l}^{A_{I,q}} x,$$

$$\left[\frac{\partial f(B_{R,q})}{\partial B_{R,q}}\right]_{n,l} = \tag{38}$$
$$\sqrt{\rho}\, x^T \left(\Xi_{n,l}^{B_{R,q}}\right)^T (y - \sqrt{\rho}\,\mathcal{H}x) + \sqrt{\rho}\,(y - \sqrt{\rho}\,\mathcal{H}x)^T \Xi_{n,l}^{B_{R,q}} x,$$

$$\left[\frac{\partial f(B_{I,q})}{\partial B_{I,q}}\right]_{n,l} = \tag{39}$$
$$\sqrt{\rho}\, x^T \left(\Xi_{n,l}^{B_{R,q}}\right)^T (y - \sqrt{\rho}\,\mathcal{H}x) + \sqrt{\rho}\,(y - \sqrt{\rho}\,\mathcal{H}x)^T \Xi_{n,l}^{B_{R,q}} x,$$

where $$\Xi_{n,l}^{A_{I,q}} = \begin{bmatrix} 0 & 0 & \cdots & \Lambda_{n,l}^{A_{I,q}} h_1 & 0 & \cdots & 0 & 0 \\ \vdots & \vdots & \ddots & \vdots & \vdots & \ddots & \vdots & \vdots \\ 0 & 0 & \cdots & \Lambda_{n,l}^{A_{I,q}} h_{M_R} & 0 & \cdots & 0 & 0 \end{bmatrix}, \tag{40}$$

with $$\Lambda_{n,l}^{A_{I,q}} = \begin{bmatrix} 0 & -\varsigma_n \eta_l^T \\ \varsigma_n \eta_l^T & 0 \end{bmatrix}, \tag{41}$$

$$\Xi_{n,l}^{B_{R,q}} = \begin{bmatrix} 0 & 0 & \cdots & 0 & \Lambda_{n,l}^{B_{R,q}} h_1 & \cdots & 0 & 0 \\ \vdots & \vdots & \ddots & \vdots & \vdots & \ddots & \vdots & \vdots \\ 0 & 0 & \cdots & 0 & \Lambda_{n,l}^{B_{R,q}} h_{M_R} & \cdots & 0 & 0 \end{bmatrix}, \tag{42}$$

with $$\Lambda_{n,l}^{B_{R,q}} = \begin{bmatrix} 0 & -\varsigma_n \eta_l^T \\ \varsigma_n \eta_l^T & 0 \end{bmatrix}, \tag{43}$$

$$\Xi_{n,l}^{B_{I,q}} = \begin{bmatrix} 0 & 0 & \cdots & 0 & \Lambda_{n,l}^{B_{I,q}} h_1 & \cdots & 0 & 0 \\ \vdots & \vdots & \ddots & \vdots & \vdots & \ddots & \vdots & \vdots \\ 0 & 0 & \cdots & 0 & \Lambda_{n,l}^{B_{I,q}} h_{M_R} & \cdots & 0 & 0 \end{bmatrix}, \tag{44}$$

with $$\Lambda_{n,l}^{B_{I,q}} = \begin{bmatrix} -\varsigma_n \eta_l^T & 0 \\ 0 & -\varsigma_n \eta_l^T \end{bmatrix}. \tag{45}$$

The design methodology depicted in FIG. 2 represents a general approach to constructing space-time codes for a wide array of receiver structures and channel characteristics. Designing space-time codes for suboptimal receivers can be a difficult task, as the performance analysis is often intractable. For very high data rate signaling or when the number of receive antennas is large, unfortunately, even the sphere decoder might be too complicated in practice. Even though conventional linear dispersion codes can be decoded by a suboptimal decoder, the codes optimized for one decoder may not be optimal for other types of decoders. On the other hand, the present invention provides a straightforward technique to optimizing codes for different receiver structures. Optimizing the codes requires only the modification in the receiver structure such that $\gamma$ ($y_i$, $x_i$, $h_i$, $\theta_k$) in Equation (18) represents the empirical performance metric for the different receiver.

Most work on space-time codes assumes the idealistic case of independent and identically distributed (i.i.d.) channels, i.e., the spatial fading is uncorrelated. However, in reality, the individual antennas could be correlated due to insufficient antenna spacing and lack of scattering. In certain situations, it can be assumed that the spatial correlation structure is known in advance. This allows the above approach to be tailored to optimally design the space-time code for a specific fading correlation scenario. For example, one could design linear dispersion codes for a typical correlation scenario where the long term spatial correlation can be measured beforehand. It is very difficult (if not impossible) to optimize the design of space-time codes analytically for a specific transmit and receive correlation structure. The present approach turns out to be useful in this scenario as well. The spatial fading correlation depends on the physical geometries of the channel. Assume there is correlation at both the transmitter side and the receiver side. One can employ an advantageous spatial fading correlation model, e.g., as disclosed in H. Bölcskei and A. J. Paulraj, "Performance of Space-Time Codes in the Presence of Spatial Fading Correlations," Proc Asilomar Conference, September 2000, wherein the channel matrix H can be decomposed into three parts, namely, $$H = S^{1/2} H_\omega R^{1/2}, \tag{46}$$

where $H_\omega$ is an $M_T \times M_R$ matrix composed of i.i.d. complex Gaussian entries with zero mean and unit variance, and $S = S^{1/2}(S^{1/2})^H$ and $R = R^{1/2}(R^{1/2})^H$ are the transmit and receive correlation matrices, respectively. It should be noted that the product-form of the assumption in the above does not incorporate the most general case of spatial fading correlation. The more general approach is to specify the correlation of the channel realization vector h defined in Equation (11). When the long term correlation, i.e. S and R, can be known in advance, this knowledge should be taken into account to lower the error probability. The only modification in the present approach in this case is that the channel matrix H should be randomly generated in accordance with the particular correlation model. All the other steps in the present approach remain the same. The present approach advantageously still will "automatically" generate the optimal codes adapting to the specific correlation structure.

It will be appreciated that those skilled in the art will be able to devise numerous arrangements and variations which, although not explicitly shown or described herein, embody the principles of the invention and are within their spirit and scope. For example, and without limitation, the present invention has been described with particular reference to generating arbitrary linear dispersion codes. As mentioned above, the above approach can be readily extended to other forms of space-time codes that can be parameterized in an advantageous manner.

Appendix

The following sets forth a proof for the following proposition: For maximum likelihood detection, with probability one, $$\nabla_\theta \gamma(y, x, h, \theta) = 0. \tag{47}$$

The n-th entry of the gradient is given by $$[\nabla_\theta \gamma(y, x, h, \theta)]_n = \lim_{\delta \to 0} \frac{\gamma(y, x, h, \theta + \delta \varsigma_n) - \gamma(y, h, x, \theta)}{\delta}, \tag{48}$$

where $\varsigma_n$ is a unit column vector with one in the nth entry, and zeros elsewhere. Note that $\gamma$ (y, x, h, $\theta$) is the empirical BEP for a given set of dispersion matrices θ, a given information symbol vector x, a given channel realization h, and a given received signal vector y, namely $$\gamma(y, x, h, \theta) = \frac{\text{\# of bit errors from } \{x \to \hat{x} \mid y, x, h, \theta\}}{Q \log_2 r}, \quad (49)$$

where $\{x \to \hat{x}|y, x, h, \theta\}$ denotes the event of decoding error where the transmitted symbol vector x is decoded into $\hat{x}$ given the channel realization h, the received signal vector y, and dispersion matrices θ. For ML decoder, we have $$\hat{x} = \arg\min_{s \in C} \|y - \sqrt{\rho}\,\mathcal{H}s\|, \quad (50)$$

where C is the set composed of all the possible transmitted symbol vectors x. Note that from (9), H depends on the dispersion matrices θ. When θ is perturbed by a small amount $\Delta\theta = \delta\zeta_n$, we have $$H_{\theta+\Delta\theta} = H + \Delta H, \quad (51)$$

where ΔH represents the small perturbation caused by the perturbation Δθ. We need to show that if δ is sufficiently small, then $$\hat{x} = \arg\min_{s \in C} \|y - \sqrt{\rho}\,\mathcal{H}_{\theta+\Delta\theta}s\|, \quad (52)$$

which means that with a small perturbation of the dispersion matrices θ, given the channel realization h and the received signal vector y, we will end up with the same vector $\hat{x}$ after decoding. Now we denote $$\min_{s \in C, s \neq \hat{x}} \|y - \sqrt{\rho}\,\mathcal{H}s\| - \|y - \sqrt{\rho}\,\mathcal{H}\hat{x}\| = \delta. \quad (53)$$

Then it is easy to show that δ>0 with probability one. Therefore, we assume that δ>0. We have $$\|y - \sqrt{\rho}\,\mathcal{H}_{\theta+\Delta\theta}\hat{x}\| = \quad (54)$$

$$\|y - \sqrt{\rho}\,\mathcal{H}\hat{x} - \sqrt{\rho}\,\mathcal{H}\hat{x} - \sqrt{\rho}\,\Delta\mathcal{H}\hat{x}\| \leq \|y - \sqrt{\rho}\,\mathcal{H}\hat{x}\| + \sqrt{\rho}\,\|\Delta\mathcal{H}\hat{x}\|.$$

Note that $$\|\Delta\mathcal{H}\hat{x}\| = \sqrt{Tr[(\Delta\mathcal{H}\hat{x})(\Delta\mathcal{H}\hat{x})^T]} \quad (55)$$

$$= \sqrt{Tr[\Delta\mathcal{H}\hat{x}\hat{x}^T(\Delta\mathcal{H})^T]}$$

$$\leq \sqrt{\|\hat{x}\|^2 Tr(\Delta\mathcal{H}(\Delta\mathcal{H})^T)}$$

$$= \|\hat{x}\|\|\Delta\mathcal{H}\|_F,$$

where we have used the fact that $Tr(BAB^T) \leq \lambda_{max}(A) Tr(BB^T)$, $\lambda_{max}(\hat{x}\hat{x}^T) = \|\hat{x}\|^2$, and $\|A\|_F$ is the Frobinums norm given by $\|A\|_F = \sqrt{Tr(AA^T)}$. Note that due to the finite cardinality of C, we can find a constant $\vartheta$ such that $$\vartheta = \max_{s \in C} \|s\|^2,$$

then from (55), we have $$\|\Delta\mathcal{H}\hat{x}\| \leq \vartheta \|\Delta H\|_F. \quad (56)$$

Substitute into (54), we obtain $$\|y - \sqrt{\rho}\,\mathcal{H}_{\theta+\Delta\theta}\hat{x}\| \leq \|y - \sqrt{\rho}\,\mathcal{H}\hat{x}\| + \sqrt{\rho}\,\vartheta\|\Delta H\|_F. \quad (57)$$

Similarly, we can show that for any $s \in C$, $s \neq \hat{x}$.

$$\|y - \sqrt{\rho}\,\mathcal{H}_{\theta+\Delta\theta}s\| = \|y - \sqrt{\rho}\,\mathcal{H}s - \sqrt{\rho}\,\Delta\mathcal{H}s\| \quad (58)$$

$$\geq \|y - \sqrt{\rho}\,\mathcal{H}s\| - \sqrt{\rho}\,\|\Delta\mathcal{H}s\|$$

$$\geq \|y - \sqrt{\rho}\,\mathcal{H}s\| - \sqrt{\rho}\,\vartheta\|\Delta\mathcal{H}\|_F.$$

Combining the above two equations we obtain that for any $s \in C$, $s \neq \hat{x}$ $$\|y - \sqrt{\rho}\,\mathcal{H}_{\theta+\Delta\theta}s\| - \|y - \sqrt{\rho}\,\mathcal{H}_{\theta+\Delta\theta}\hat{x}\| \geq \|y - \sqrt{\rho}\,\mathcal{H}s\| - \quad (59)$$

$$\|y - \sqrt{\rho}\,\mathcal{H}\hat{x}\| - 2\sqrt{\rho}\,\vartheta\|\Delta\mathcal{H}\|_F \geq \delta - 2\sqrt{\rho}\,\vartheta\|\Delta\mathcal{H}\|_F.$$

Note that due to the continuity of $\|H\|_F$ with respect to the set of dispersion matrices θ as can be seen from (9), when δ is sufficiently small, we have $$\sqrt{\rho}\,\vartheta\|\Delta\mathcal{H}\|_F \leq \frac{\delta}{4}. \quad (60)$$

Therefore, we obtain for any $s \neq \hat{x}$ $$\|y - \sqrt{\rho}\,\mathcal{H}_{\theta+\Delta\theta}s\| - \|y - \sqrt{\rho}\,\mathcal{H}_{\theta+\Delta\theta}\hat{x}\| \geq \frac{\delta}{2} > 0, \quad (61)$$

which means that $$\hat{x} = \arg\min_{s \in C} \|y - \sqrt{\rho}\,\mathcal{H}_{\theta+\Delta\theta}s\|.$$

Therefore, when δ is sufficiently small, we have $$\gamma(y, x, h, \theta + \delta\zeta_n) = \gamma(y, x, h, \theta) \quad (62)$$

which means that (47) holds.

What is claimed is:
1. A method of generating space-time codes for a transmission system comprising the steps of:
   (i) selecting a set of initial coding parameters for the space-time code;

(ii) simulating a series of observations based on a model of known communication channel characteristics and decoding the simulated series of observations using a selected receiver structure so as to compute a performance metric for the coding parameters;

(iii) estimating a gradient for the performance metric as a function of the coding parameters;

(iv) updating the coding parameters for the space-time code using the estimated gradient;

(v) repeating steps (ii) through (iv) until an optimized set of coding parameters is obtained for the space-time code.

2. The method of claim 1 wherein the performance metric is the bit error probability.

3. The method of claim 1 wherein the performance metric is the frame error probability.

4. The method of claim 1 wherein the gradient is estimated using a score function method.

5. The method of claim 1 wherein the gradient is estimated by $$\hat{g}(\theta_k) = \frac{1}{M}\sum_{i=1}^{M} \gamma(y_i, x_i, \theta_k)[\nabla_q \log p(y_i \mid x_i, \theta)\mid_{\theta=\theta_k}]$$

where $y_i$ are the simulated observations based on coded symbols $x_i$, M is the number of simulated observations, $\theta$ are the coding parameters, and $\gamma$ is the computed performance metric.

6. The method of claim 1 wherein the coding parameters are updated at step (iv) in accordance with $$\theta_k - a_k \hat{g}(\theta_k),$$

where $\theta_k$ represents the coding parameters, $\hat{g}(\theta_k)$ is the estimated gradient, and $a_k$ is a positive constant that varies with k.

7. The method of claim 6 wherein the coding parameters are updated by projecting results on a nearest point in a constraint space.

8. The method of claim 1 wherein the selected receiver structure is a suboptimal detector.

9. The method of claim 1 wherein the coding parameters are dispersion matrices for a linear dispersion code.

10. A transmission system which utilizes the space-time codes generated by the method of claim 1.

11. A transmitter comprising:

a plurality of antennas; and an encoder responsive to incoming symbols and which delivers coded symbols to said antennas in a series of time intervals, the coded symbols arranged in accordance with a space-time code where the space-time code is generated by (i) selecting a set of initial coding parameters for the space-time code;

(ii) simulating a series of observations based on a model of known communication channel characteristics and decoding the simulated series of observations using a selected receiver structure so as to compute a performance metric for the coding parameters;

(iii) estimating a gradient for the performance metric as a function of the coding parameters;

(iv) updating the coding parameters for the space-time code using the estimated gradient;

(v) repeating steps (ii) through (iv) until an optimized set of coding parameters is obtained for the space-time code.

12. The transmitter of claim 11 wherein the performance metric is the bit error probability.

13. The transmitter of claim 11 wherein the performance metric is the frame error probability.

14. The transmitter of claim 11 wherein the gradient is estimated using a score function method.

15. The transmitter of claim 11 wherein the gradient is estimated by $$\hat{g}(\theta_k) = \frac{1}{M}\sum_{i=1}^{M} \gamma(y_i, x_i, \theta_k)[\nabla_q \log p(y_i \mid x_i, \theta)\mid_{\theta=\theta_k}]$$

where $y_i$ are the simulated observations based on coded symbols $x_i$, M is the number of simulated observations, $\theta$ are the coding parameters, and $\gamma$ is the computed performance metric.

16. The transmitter of claim 11 wherein the coding parameters are updated at step (iv) in accordance with $$\theta_k - a_k \hat{g}(\theta_k),$$

where $\theta_k$ represents the coding parameters, $\hat{g}(\theta_k)$ is the estimated gradient, and $a_k$ is a positive constant that varies with k.

17. The transmitter of claim 16 wherein the coding parameters are updated by projecting results on a nearest point in a constraint space.

18. The transmitter of claim 11 wherein the selected receiver structure is a suboptimal detector.

19. The transmitter of claim 11 wherein the coding parameters are dispersion matrices for a linear dispersion code.

20. A receiver comprising:

a plurality of antennas; and a decoder which receives incoming symbols from said antennas in a series of time intervals and which interprets the incoming symbols using a pre-specified detector structure and which delivers decoded symbols arranged in accordance with a space-time code where the space-time code is generated by (i) selecting a set of initial coding parameters for the space-time code;

(ii) simulating a series of observations based on a model of known communication channel characteristics and decoding the simulated series of observations using the pre-specified detector structure so as to compute a performance metric for the coding parameters;

(iii) estimating a gradient for the performance metric as a function of the coding parameters;

(iv) updating the coding parameters for the space-time code using the estimated gradient;

(v) repeating steps (ii) through (iv) until an optimized set of coding parameters is obtained for the space-time code.

21. The receiver of claim 20 wherein the performance metric is the bit error probability.

22. The receiver of claim 20 wherein the performance metric is the frame error probability.

23. The receiver of claim 20 wherein the gradient is estimated using a score function method.

24. The receiver of claim 20 wherein the gradient is estimated by $$\hat{g}(\theta_k) = \frac{1}{M} \sum_{i=1}^{M} \gamma(y_i, x_i, \theta_k)[\nabla_q \log p(y_i | x_i, \theta)|_{\theta=\theta_k}]$$

where $y_i$ are the simulated observations based on coded symbols $x_i$, M is the number of simulated observations, θ are the coding parameters, and γ is the computed performance metric.

25. The receiver of claim 20 wherein the coding parameters are updated at step (iv) in accordance with $$\theta_k - a_k \hat{g}(\theta_k),$$

where $\theta_k$ represents the coding parameters, $\hat{g}(\theta_k)$ is the estimated gradient, and $a_k$ is a positive constant that varies with k.

26. The receiver of claim 25 wherein the coding parameters are updated by projecting results on a nearest point in a constraint space.

27. The receiver of claim 20 wherein the selected receiver structure is a suboptimal detector.

28. The receiver of claim 20 wherein the coding parameters are dispersion matrices for a linear dispersion code.

* * * * *